(12) United States Patent
Ojala et al.

(10) Patent No.: US 8,356,226 B2
(45) Date of Patent: Jan. 15, 2013

(54) METHOD AND APPARATUS FOR PROVIDING A DATA RETRANSMISSION SCHEME

(75) Inventors: Jussi K. Ojala, Helsinki (FI); Benoist P. Sebire, Tokyo (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/163,995

(22) Filed: Jun. 20, 2011

(65) Prior Publication Data
US 2011/0246846 A1 Oct. 6, 2011

Related U.S. Application Data

(62) Division of application No. 12/110,490, filed on Apr. 28, 2008, now Pat. No. 7,996,744.

(60) Provisional application No. 60/914,990, filed on Apr. 30, 2007.

(51) Int. Cl.
*H04L 1/18* (2006.01)
(52) U.S. Cl. ........................................ 714/748
(58) Field of Classification Search .................. 714/748, 714/751
See application file for complete search history.

(56) References Cited

U.S. PATENT DOCUMENTS

| | | | | |
|---|---|---|---|---|
| 7,185,257 B2* | 2/2007 | Kim et al. | | 714/751 |
| 7,197,317 B2* | 3/2007 | Parkvall et al. | | 455/452.1 |
| 7,227,904 B2* | 6/2007 | Von Elbwart et al. | | 375/261 |
| 7,436,834 B1* | 10/2008 | Zhang et al. | | 370/389 |
| 7,436,838 B2* | 10/2008 | Filsfils et al. | | 370/395.31 |
| 7,567,622 B2* | 7/2009 | Wengerter et al. | | 375/267 |
| 7,609,680 B2* | 10/2009 | Kim | | 370/342 |
| 7,668,110 B2 | 2/2010 | Seol et al. | | |
| 7,676,732 B2 | 3/2010 | Moon et al. | | |
| 7,760,812 B2 | 7/2010 | Liu et al. | | |
| 2002/0129312 A1 | 9/2002 | Sipola | | |
| 2003/0078008 A1 | 4/2003 | Gruhn et al. | | |
| 2006/0013161 A1 | 1/2006 | Suzuki | | |
| 2006/0036922 A1 | 2/2006 | Hong et al. | | |
| 2009/0217118 A1* | 8/2009 | Miki et al. | | 714/748 |

FOREIGN PATENT DOCUMENTS
EP 1 217 777 A1 6/2002

OTHER PUBLICATIONS

International Search Report and Written Opinion, PCT/IB2008/001064, Dec. 2, 2008, pp. 1-12.
Office Action for related U.S. Appl. No. 12/110,490, Oct. 4, 2010, pp. 1-18.

* cited by examiner

*Primary Examiner* — Esaw Abraham
(74) *Attorney, Agent, or Firm* — Ditthavong Mori & Steiner, P.C.

(57) ABSTRACT

An approach is provided for efficient retransmissions by allocating a transmission resource for transmitting data and allocating a retransmission resource for retransmitting the data according to a transmission scheme that specifies relationship between the transmitted data and the retransmitted data for providing communication over a radio network.

25 Claims, 14 Drawing Sheets

METHOD AND APPARATUS FOR PROVIDING A DATA RETRANSMISSION SCHEME

RELATED APPLICATIONS

This application is a divisional application of U.S. patent application Ser. No. 12/110,490, filed Apr. 28, 2008 and issued as U.S. Pat. No. 7,996,744, which claims the benefit of the earlier filing date under 35 U.S.C. §119(e) of U.S. Provisional Application Ser. No. 60/914,990 filed Apr. 30, 2007, entitled "Method and Apparatus For Providing A Data Retransmission Scheme"; the entireties of which are incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. In particular, it is recognized that transmission errors impose a significant cost on capacity, as corrupted packets can require retransmitting the packets, thereby consuming additional bandwidth without increasing effective throughput. Thus, retransmission mechanisms play an important role in ensuring high throughput and efficient bandwidth utilization.

SOME EXEMPLARY EMBODIMENTS

Therefore, there is a need for an approach for providing efficient retransmissions.

According to one embodiment of the invention, a method comprises allocating a first transmission resource for transmitting data according to a transmission scheme. The method also comprises allocating a second transmission resource for retransmitting the data according to the transmission scheme. The transmission scheme specifies a relationship between the transmitted data and the retransmitted data for error detection of the transmitted data.

According to another embodiment of the invention, a processor configured to allocate a first transmission resource for transmitting data according to a transmission scheme, and to allocate a second transmission resource for retransmitting the data according to the transmission scheme. The transmission scheme specifies a relationship between the transmitted data and the retransmitted data for error detection of the transmitted data.

According to another embodiment of the invention, a system comprises a base station configured to allocate a first transmission resource for transmitting data according to a transmission scheme and to allocate a second transmission resource for retransmitting the data according to the transmission scheme. The transmission scheme specifies a relationship between the transmitted data and the retransmitted data for error detection of the transmitted data.

According to another embodiment of the invention, an apparatus comprises means for allocating a first transmission resource for transmitting data according to a transmission scheme. The apparatus further comprises means for allocating a second transmission resource for retransmitting the data according to the transmission scheme. The transmission scheme specifies a relationship between the transmitted data and the retransmitted data for error detection of the transmitted data.

According to another embodiment of the invention, a method comprises receiving data according to a first allocation. The method also comprises receiving retransmission of the data according to second allocation that specifies a relationship with the received data. The method further comprises combining the received data and the retransmitted data based on the relationship.

According to yet another embodiment of the invention, an apparatus comprises a transceiver configured to receive data according to a first allocation, and to receive retransmission of the data according to second allocation that specifies a relationship with the received data. The apparatus also comprises error detection logic configured to combine the received data and the retransmitted data based on the relationship.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing a data retransmission scheme are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Long Term Evolution (LTE) architecture and semi-persistent scheduling, it is recognized by one of ordinary skill in the art that the embodiments of the inventions have applicability to any type of communication system and equivalent functional capabilities.

Figure 1:
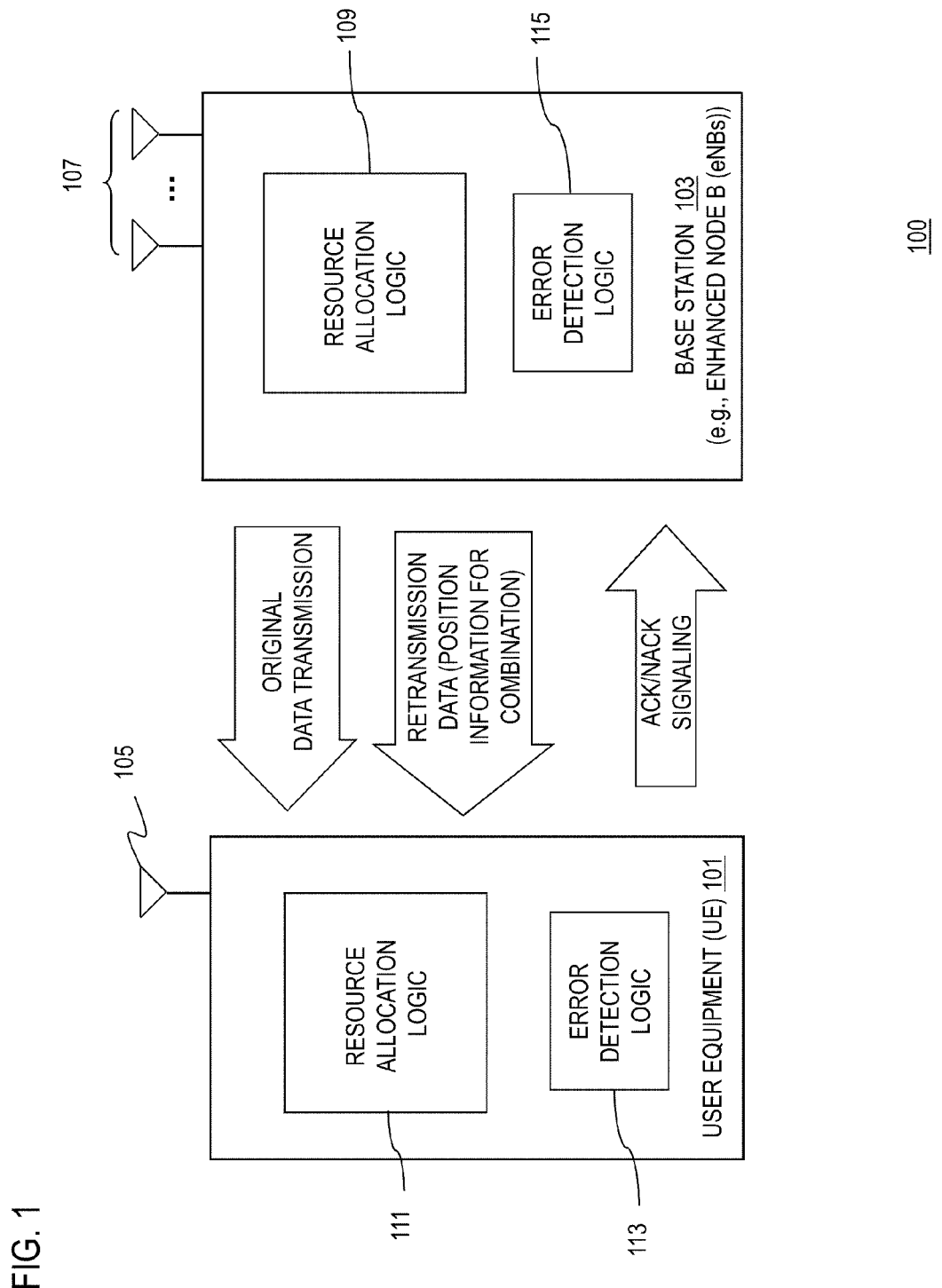
FIG. 1 is a diagram of a communication system capable of providing an efficient retransmission scheme, according to an exemplary embodiment of the invention.

FIG. 1 is a diagram of a communication system capable of providing an efficient retransmission scheme, according to an exemplary embodiment of the invention. As shown in FIG. 1, one or more user equipment (UEs) 101 communicate with a base station 103, which is part of an access network (e.g., 3GPP LTE (or E-UTRAN, etc.). Under the 3GPP LTE architecture (as shown in FIGS. 7A-7D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants or any type of interface to the user (such as "wearable" circuitry, etc.). The UE 101 includes a transceiver (not shown) and an antenna system 105 that couples to the transceiver to receive or transmit signals from the base station 103; the antenna system 105 can include one or more antennas.

As with the UE 101, the base station 103 employs a transceiver (not shown), which transmits information to the UE 101. Also, the base station 103 can employ one or more antennas 107 for transmitting and receiving electromagnetic signals. For instance, the Node B 103 may utilize a Multiple Input Multiple Output (MIMO) antenna system 107, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

For the purposes of illustration, the system 100 of FIG. 1 is a 3GPP LTE system, which provides a retransmission scheme that addresses, in part, the complexities associated with, for example, downlink semi-persistent scheduling. In LTE, semi-persistent allocation can be used to support such applications requiring low bit rate service with fairly constant bit rate, such as Voice over Internet Protocol (VoIP). Persistent allocation involves allocating some resources to a given user persistently, in contrast to allocating the resources dynamically on a transmission time interval (TTI) basis. Semi-persistent allocation can provide more efficient L1/L2 control signaling (which is typically used for dynamic allocation). As shown, the base station 103 includes resource allocation logic 109, which operates in conjunction with resource allocation logic 111 in the UE 101 to signal such allocations.

The system 100 of FIG. 1, in certain embodiments, uses concatenation of Forward Error Correction (FEC) coding and an Automatic Repeat Request (ARQ) protocol commonly known as Hybrid ARQ (HARM). Automatic Repeat Request (ARQ) is an error detection mechanism using error detection logic 113 and 115. This mechanism permits the receiver to indicate to the transmitter that a packet or sub-packet has been received incorrectly, and thus, the receiver can request the transmitter to resend the particular packet(s). This can be accomplished with a Stop and Wait (SAW) procedure, in which the transmitter waits for a response from the receiver before sending or resending packets. The erroneous packets are used in conjunction with retransmitted packets.

In case of re-transmissions, the user equipment (UE) 101 has no knowledge of when the initial transmission has taken place (from allowed time-frequency resources). This adds complexity to the UE 101, since the UE 101 has to blindly combine the re-transmission with all possible initial transmissions. The approach described herein, according to various embodiments, removes the blind combination possibility to limit the complexity increase introduced by semi-persistent scheduling.

Figure 2:
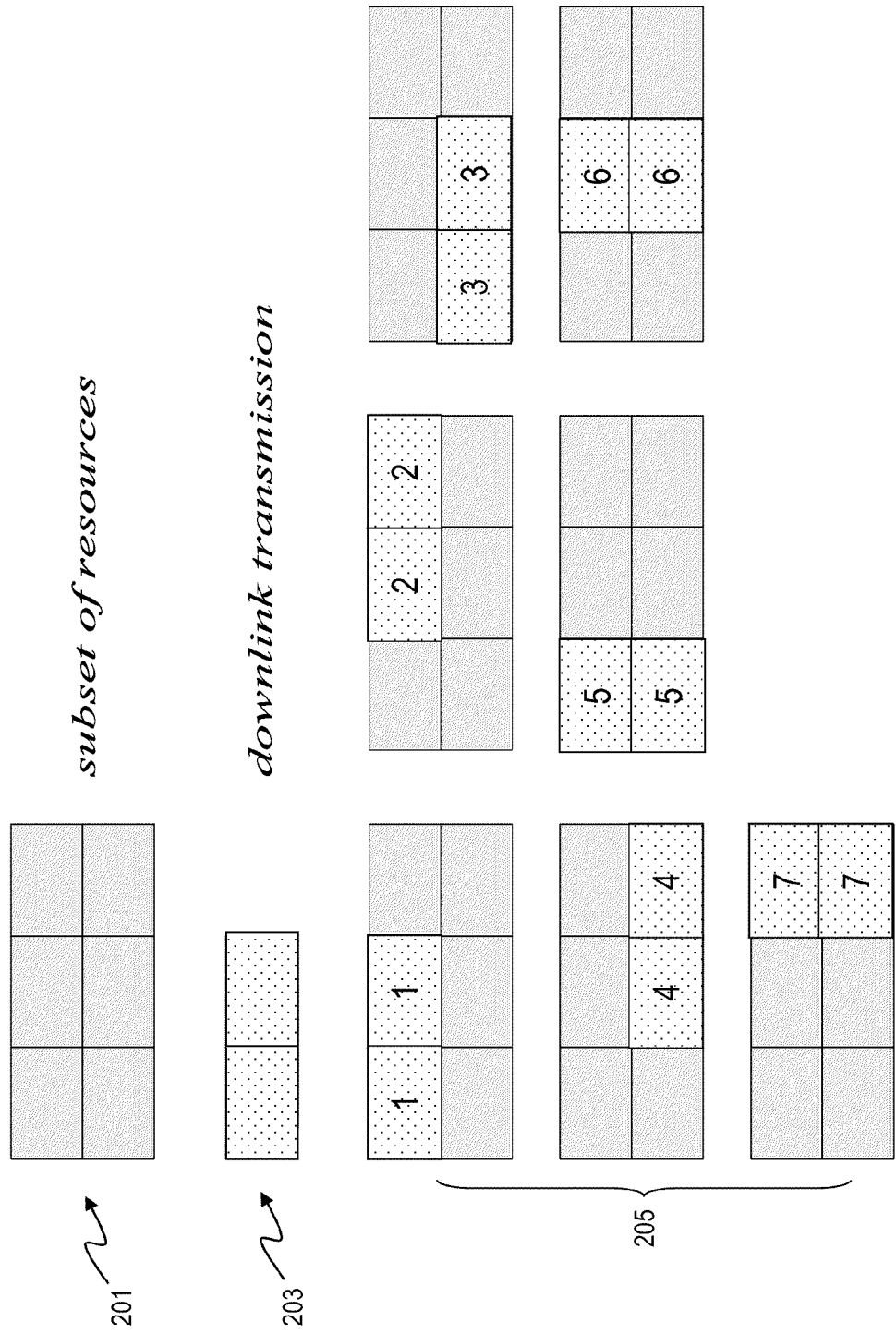
FIG. 2 is a diagram of an exemplary scheme for combining retransmissions, according to various embodiments of the invention.

FIG. 2 is a diagram of an exemplary scheme for combining retransmissions, according to various embodiments of the invention. In this example, the allocated resources involve physical resource blocks (PRB) 201, which correspond to OFDM symbols, to provide communication between the UE 101 and the base station 103. That is, the OFDM symbols are organized into a number of physical resource blocks (PRB) 201 that includes consecutive sub-carriers for corresponding consecutive OFDM symbols. To indicate which physical resource blocks (or sub-carrier) are allocated to a UE 101, two exemplary schemes include: (1) bit mapping, and (2) (start, length) by using several bits indicating the start and the length of an allocation block.

By way of example, it is assumed that a transmission 203 takes two consecutive PRBs in time or in frequency (i.e., transmission resources) to be transmitted, if the subset of resources 201 comprises six PRBs with three time slot spanning two frequencies, there are seven possible positions 205 for the first transmission 201.

The various embodiments of the invention, as detailed in FIGS. 3-6, removes the blind combination possibility to limit the complexity increase associated with persistent (e.g., semi-persistent) scheduling.

To better appreciate the various embodiments of the invention, it is instructive to briefly describe the development of 3GPP systems. For example, the 3GPP Release 5 specifications introduced High-Speed Downlink Packet Access (HSDPA) as a part of the Wideband Code Division Multiple Access (WCDMA) standard for Universal Mobile Telecommunication System (UMTS). The Release 6 introduced a Fractional Dedicated Physical Channel (DPCH) to be used with HSDPA for support of high number of simultaneous HSDPA users in a cell. The 3GPP has further seen a proposal for Release 7 for eliminating the need of High-Speed Shared Control Channel (HS-SCCH) channel for HSDPA operation when applied with Voice over Internet Protocol (VoIP) traffic or another similar traffic low data rate source.

The Release 6 HSDPA operation uses the HS-SCCH for a Node B 103 of a network to indicate a given user equipment (UE) 101 that there is a High-Speed downlink Shared Channel (HS-DSCH) transmission on one or more of multiple parallel High Speed Physical Downlink Shared Channels (HS-PDSCH) allocated to the UE 101. The HS-SCCH thus identifies the intended receiver and informs the receiver of the characteristics of the HS-PDSCHs to be used for transmitting the actual data packet. Such characteristics include a transport block size, the number of HS-PDSCH spreading codes and actual spreading code numbers to be used, a modulation (e.g., quadrature phase shift keying (QPSK)/16 quadrature amplitude modulation (QAM)) and redundancy version of the HS-DSCH payload transmitted during a given Transmission Time Interval (TTI).

The Release 7 HSDPA without HS-SCCH proposes to eliminate the HS-SCCH completely for specific sized small HS-DSCH packets transmitted on a pre-allocated HS-PDSCH code channel. The HSDPA operation without HS-SCCH eliminates the need of HS-SCCH, if a data packet being transmitted to a given UE 101 is one of two predefined sizes, is transmitted on a pre-allocated HS-PDSCH spreading code channel, and has a predefined format (modulation scheme, channelization codes, Hybrid Automatic Repeat Request (HARM) process identifier, redundancy version, and transport block size). The UE 101 simply tries to constantly receive the predefined transport block sizes from the pre-defined HS-PDSCH spreading code channel, and if a data cyclic redundancy check (CRC), which is user-specific, indicates that the packet is received correctly, the UE 101 knows that there was a packet transmission to that user and that it was received correctly. The benefit of such a proposal is that with a large number of users with small, but constant data rate needs (such as VoIP users) the cost of HS-SCCH compared to actual data delivery is significantly large and a larger system capacity could be obtained by avoiding the transmission of HS-SCCH when transmitting the most frequent small packets. However, HARQ retransmissions is problematic. In HSDPA Release 6 operation, if the HS-DSCH packet delivery fails, the UE 101 will transmit a negative acknowledgement (NACK) to the Node B 103, and the Node B 103 may retransmit the HS-DSCH packet at a later occasion by using a different HARQ redundancy version. Notably, the timing of the retransmission is completely subject to a decision of the Node B 103.

The HSDPA operation without the HS-SCCH requires the retransmissions to take place at an exact known time instant and to use exact and predefined redundancy version sequence (or chase combining only). This restricts the possibility for the Node B 103 to schedule the retransmissions from what is possible in Release 6 HSDPA operation.

Furthermore, the HSDPA operation without HS-SCCH, as proposed in 3GPP, requires the UE 101 to blindly combine possible initial transmissions and possible retransmissions in an iterative manner until it finds a CRC that indicates a correctly received packet. This implies increased processing burden to the UE 101.

3GPP TSG RAN WG1 documents R1-051511 and R1-060450, which have been incorporated herein as a reference in their entireties, describe the HSDPA operation without HS-SCCH, thus requiring synchronous retransmission operation and blind HARQ combining by the UE 101.

In recognition of the above problems, an approach, according to certain embodiments, is described that avoids blind combining by indicating position of the initial transmission.

Figure 3:
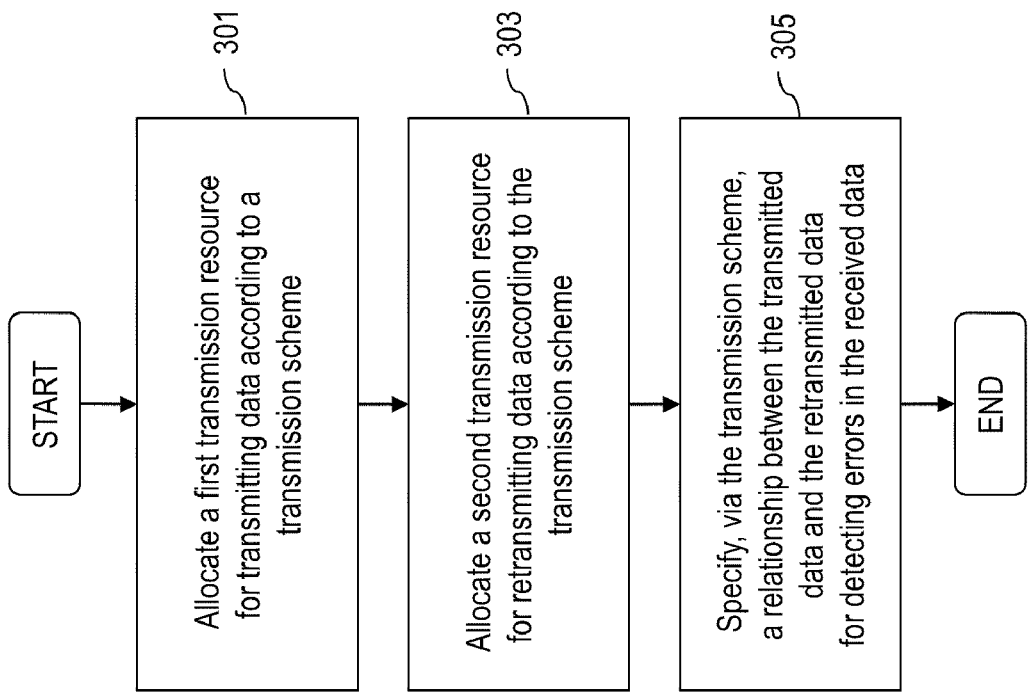
FIG. 3 is a flowchart of a retransmission process that specifies a relationship between a prior transmission and a corresponding retransmission, according to an exemplary embodiment of the invention.

FIG. 3 is a flowchart of a retransmission process that specifies a relationship between a prior transmission and a corresponding retransmission, according to an exemplary embodiment of the invention. Basically, the process, according to various embodiments, avoids blindly combining semi-persistent scheduling in the UE 101 by linking the retransmission to the initial transmission either in time or frequency. In step 301, a first transmission resource (e.g., time or frequency) is allocated for transmitting data according to a particular transmission scheme. Subsequently, another resource is allocated for the retransmission, per step 303. The transmission scheme specifies, per step 305, the relationship between the transmitted data and the retransmitted data for detecting errors in the received data (e.g., as in the case of HARQ). In an exemplary embodiment, this allocation, which indicates the position of the prior transmission, can be performed by the network—e.g., via the base station (eNode) 103.

With the above process, the UE 101 can combine the retransmission with the original transmission without undue processing using to the position information.

Figure 4:
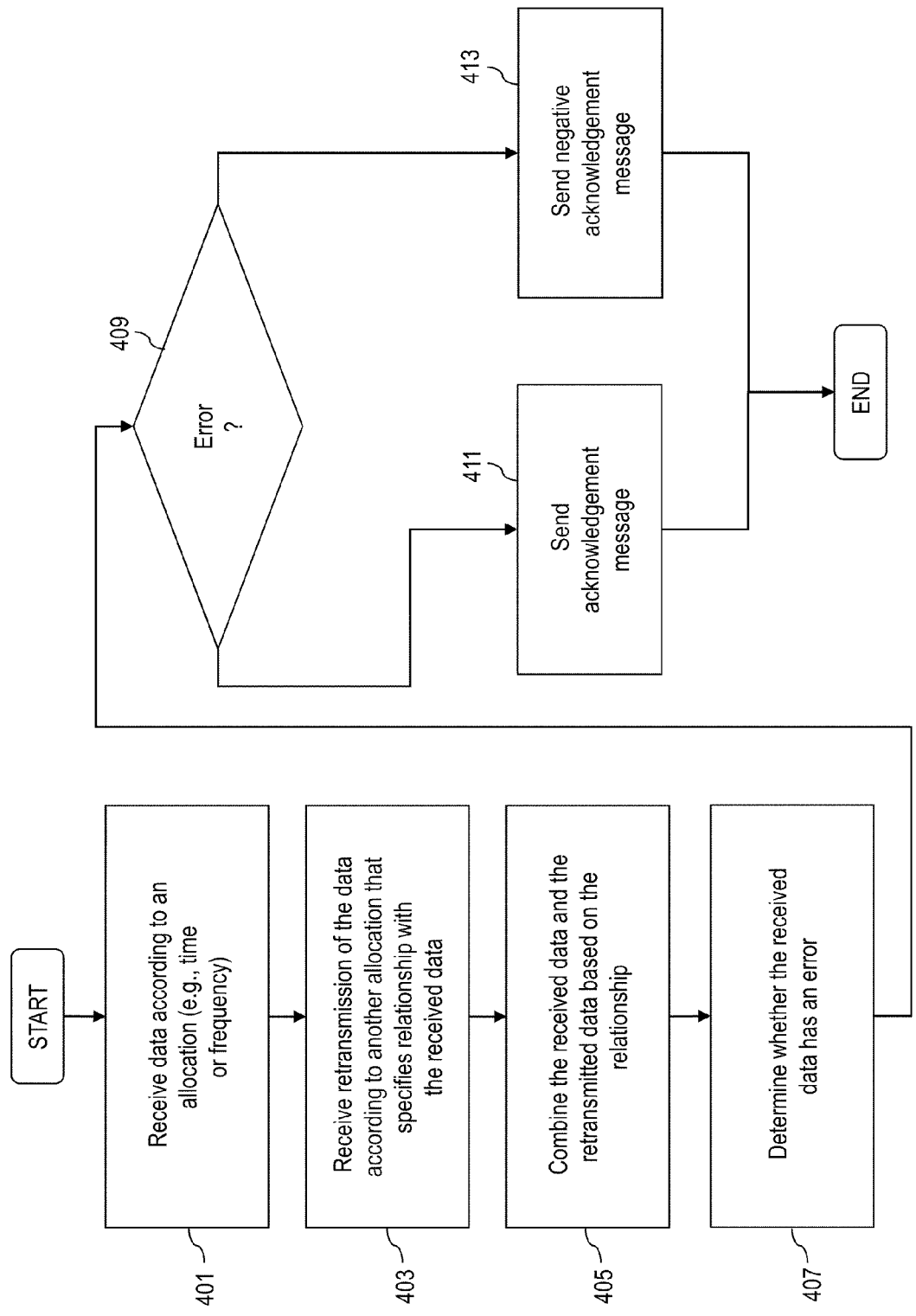
FIG. 4 is a flowchart of process for combining data transmissions based on the relationship between a prior transmission and a subsequent retransmission, according to an exemplary embodiment of the invention.

FIG. 4 is a flowchart of a process for combining data transmissions based on the relationship between a prior transmission and a subsequent retransmission, according to an exemplary embodiment of the invention. From the UE (or terminal) side, per step 401, data is received according to an allocation (e.g., fixed in time or frequency). Next, per step 403, retransmission of the data is received according to another allocation. This allocation specifies the relationship with the prior data transmission. With this knowledge, per step 405, the terminal can combine the early transmission with the retransmitted data based on the relationship.

Next, in step 407, the terminal can determine whether the data contains an error. If no error exists, per step 409, then the terminal (e.g., according to a HARQ procedure) generates and transmits an acknowledgement message (ACK), per step 411. Otherwise, the terminal transmits a negative acknowledgement (NACK), per step 413.

Figure 5A:
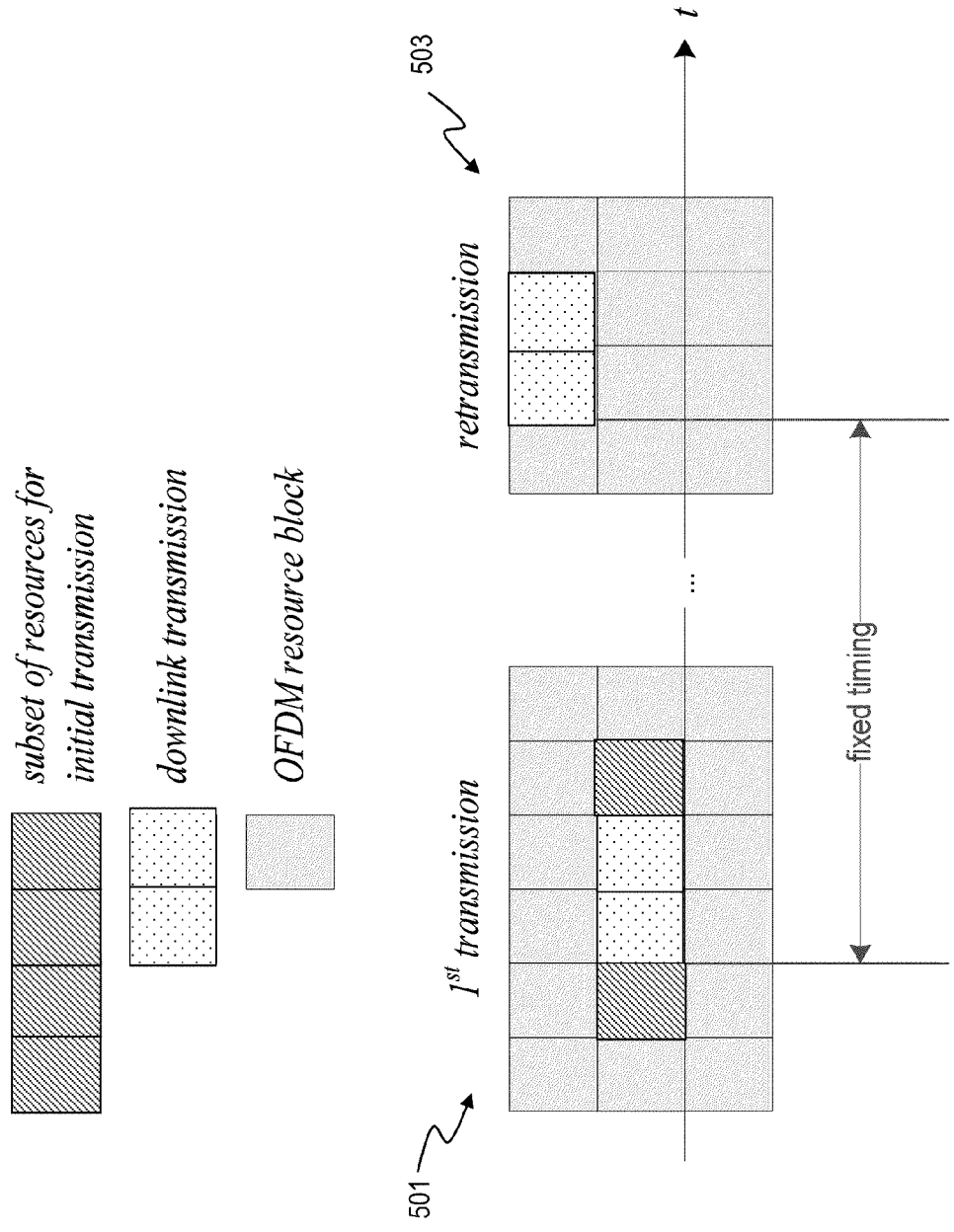
FIGS. 5A and 5B are diagrams of exemplary retransmission schemes, according to various embodiments of the invention.
Figure 5B:
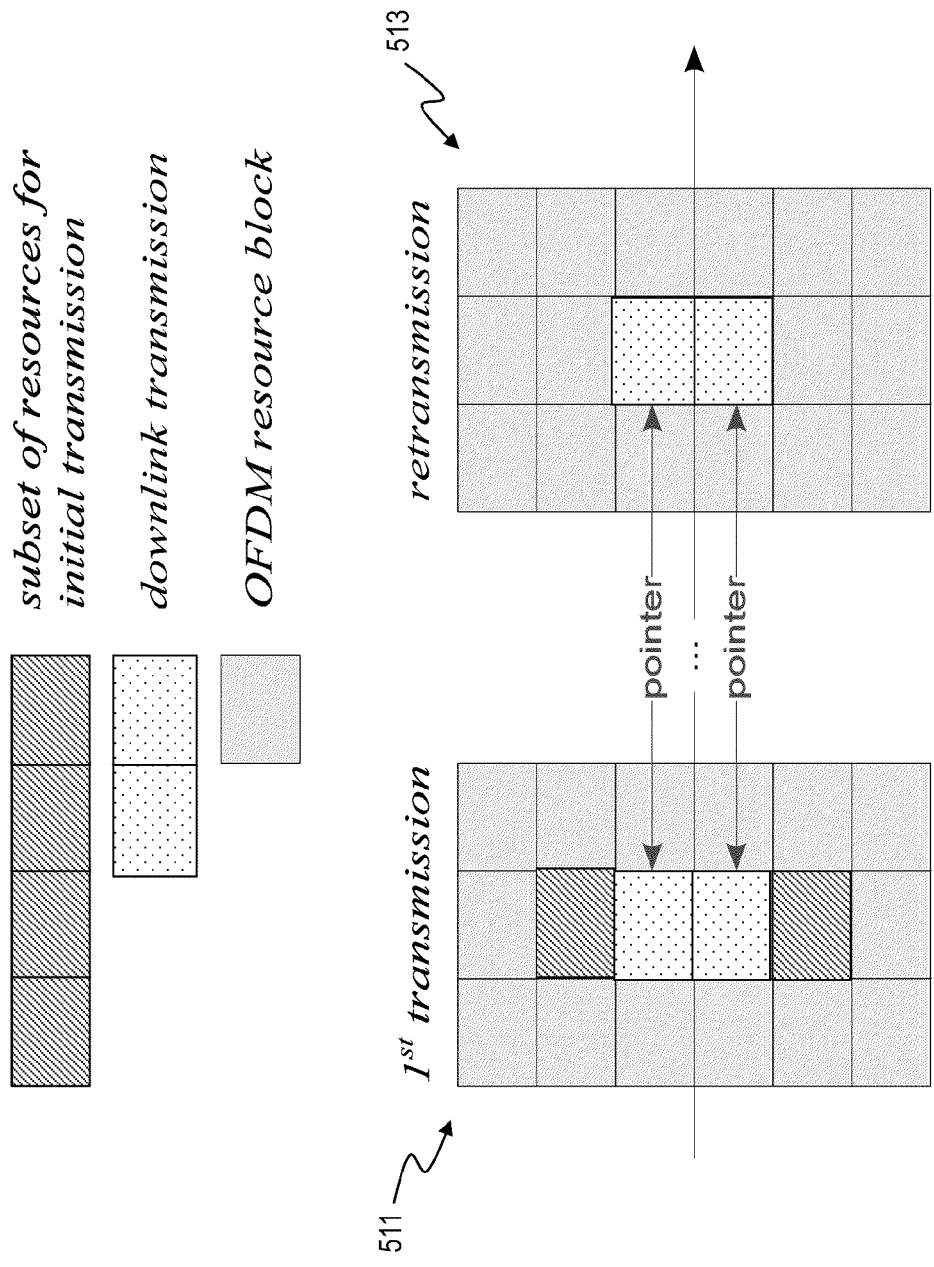

FIGS. 5A-5C are diagrams of exemplary retransmission schemes, according to various embodiments of the invention. In the examples of FIGS. 5A-5C, the allocation of initial/retransmission can use, but is not limited to, consecutive physical resource blocks (PRBs).

According to an exemplary embodiment, to provide flexibility to the scheduler of the base station 103 (e.g., eNodeB) and thus maintain the capacity of the network, semi-persistent allocation can define a subset of resources (several possible time and frequency resources or physical resources blocks—PRBs) where the e-NodeB 103 would transmit to the UE 101 with a pre-defined transport format (e.g., modulation and coding scheme, transport block size).

In the example of FIG. 5A, PRBs for the first allocation 501 is fixed in frequency and dynamic in time. Further, synchronous adaptive retransmission can be employed, wherein timing of the retransmissions 503 indicates whether the transmission is the first transmission. Under this scenario, freedom in the first transmission 501 is in the time domain (in which retransmissions 503 are adaptive but synchronous). In this manner, retransmissions 503 indicate through their timing, the position of the first transmission 501.

In another embodiment (as shown in FIG. 5B), PRBs for the first allocation is fixed in time, and dynamic in frequency. In this case, non-adaptive retransmission 511 is utilized, whereby the frequency of the retransmissions 513 indicates the first transmission 511. Under this scenario, freedom in the first transmission 511 is in the frequency domain, and wherein the retransmissions 513 are asynchronous, but non-adaptive. Namely, retransmissions 513 specify the position of the first transmission 513 through their position in frequency.

In the above embodiments, the retransmission indicates the position of the first transmission (either in time or in frequency), and thus, blind decoding is avoided. Alternatively, the L1/L2 control signaling can be modified to include the position of the first transmission.

Figure 6A:
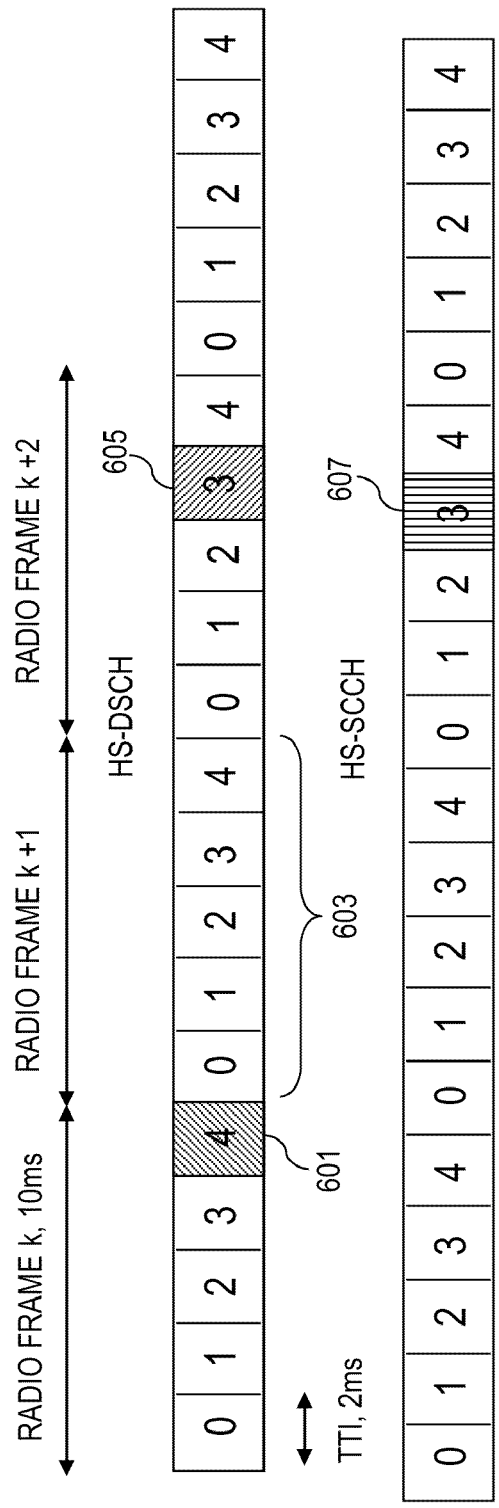
FIGS. 6A and 6B are diagrams of data transmission schemes utilizing control channel signaling to indicate transmission time interval, according to various exemplary embodiments of the invention.
Figure 6B:
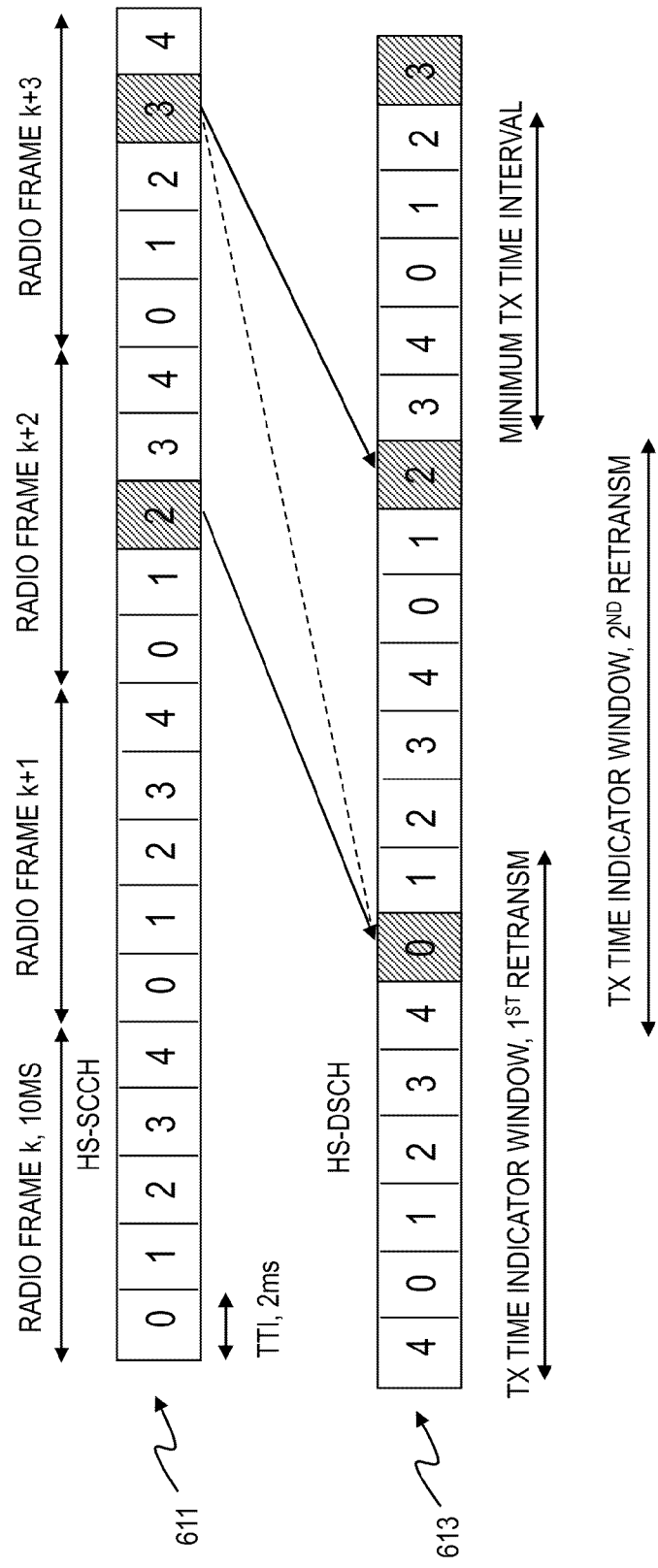

FIGS. 6A and 6B are diagrams of data transmission schemes utilizing control channel signaling to indicate transmission time interval, according to various exemplary embodiments of the invention. For the purposes of explanation, this control signaling mechanism is described with respect to the system 100 of FIG. 1.

In this example, the base station 103 transmits a data packet to the UE 101 in a transmission time interval (TTI) 601 in FIG. 6A. It is assumed that this transmission is the initial transmission of the data packet and that the base station 103 has transmitted the transport parameters to the UE 101 in advance. Accordingly, the data packet is transmitted without a separate HS-SCCH (High Speed-Shared Control Channel) message, which would indicate that the TTI comprises the data packet for the UE 101. Therefore, the UE 101 attempts to detect, with the received reception parameters, the data packet that is expected to be a received on a data channel. The detection is performed without the knowledge of the actual transmission time interval used in the transmission of the data packet. If the UE 101 is able to decode the data packet, it transmits an ACK-signal to the base station. If the UE 101 is not able to decode the data packet, it determines that the TTI either did not include a data packet for it, or that if it did then the reception was not successful. The UE 101 may store the data received within the TTI to a buffer for later use.

If the base station 103 does not receive an acknowledgement (ACK) signal within a given time period, it retransmits the data packet, along with a control channel (HS-SCCH) message. The retransmission of the data packet and the transmission of the HS-SCCH message (i.e., control message) are carried out within the TTIs 603 and 605, respectively. The retransmission may comprise the same encoded data packet transmitted in the previous transmission or additional information facilitating the detection and decoding of the previously transmitted data packet. In this manner, both chase combining and incremental redundancy are supported as HARQ-schemes. In one embodiment, the HS-SCCH message and the retransmission of the data packet may be carried out simultaneously (or concurrently). It is noted typically that the HS-SCCH message transmission is started a few time slots (e.g., two slots) before the data packet. The HS-SCCH message can provide an indication of whether the data packet is a retransmission of a previously sent data packet or whether it is an initial transmission of a new data packet. This indication may be derived from a one-bit New Data Indicator (NDI) within the HS-SCCH message, or a new indication may be specified.

The HS-SCCH message can also specify new transport parameters for the retransmission of the data packet. According to one embodiment, the HS-SCCH message may further include a transmission time indicator (e.g., transmission time interval) of the previous transmission of the data packet. In this example, the previous transmission is the initial transmission carried out in the TTI 601. Such information is used by the UE to learn which TTIs comprise data packets that should be combined together for correctly decoding the data.

When the UE 101 observes that there is a control message destined to it, the UE 101 detects and decodes the contents of the message to determine whether the transmission is a retransmission to a previously attempted initial transmission (which may have been sent without an accompanying HS-SCCH message). The UE 101 may also optionally receive new transport parameters to be used in detecting and decoding the retransmission data packet. Furthermore, the UE 101 obtains the transmission time indicator related to the previous transmission of the data packet. On the basis of this transmission time indicator, the UE 101 obtains knowledge about the TTI used in the previous transmission of the data packet. Since the UE 101 now has the knowledge of the TTI of the previous (initial) transmission and the retransmission of the data packet and the transport parameters for the both transmissions, it may detect the previously transmitted and buffered data packet and the retransmitted data packet, combine the contents of them, and decode the combined data. As mentioned above, the UE 101 had stored the TTIs containing data that it was not able to detect in the buffer. The UE 101 may now process the previously transmitted data packet with the old transport parameters and the retransmission of the data packet with the new transport parameters obtained from the HS-SCCH message.

After the UE 101 has detected the previously transmitted data packet and the retransmission of the data packet, it may combine the data packets according to a conventional HARQ procedure and attempt decoding of the combined information. Thereafter, the UE 101 may check whether the combined data packet still has errors. If the data packet contains no errors, the UE 101 may transmit an ACK-signal to the base station 103. If the data packet still contains errors, the UE 101 may transmit a NACK-signal to the base station 103. Alternatively, the UE 101 may transmit nothing. If the base station 103 does not receive the ACK-signal within a given time period, or receives the NACK-signal, the base station 103 transmits an additional retransmission data packet. The additional retransmission data packet may be transmitted as the retransmission data packet described above. The base station 103 may continue to retransmit until it receives an ACK-signal.

The transmission time indicator concerning the TTI in which the previous transmission of the data packet was carried out may be transmitted in a location or field of the HS-SCCH message also used for transmitting a HARQ process number. Since the previous (initial) transmission was transmitted without the HS-SCCH message, the previously transmitted data packet would not have a HARQ process number. Accordingly, the HS-SCCH message can include specific information indicating whether the information in the location of the HARQ process number relates to a data packet transmitted previously without a HS-SCCH message (and without the HARQ process number) or to a conventional HARQ process according to Release 6 of 3GPP. The specific information may be included as explicit signaling information, for example with a UE-specific identifier, or the UE 101 may derive the information implicitly from the HS-SCCH message. The HS-SCCH message may, for example, have a specific information bit pattern that would not be a valid combination according to Release 6 of 3GPP.

This specific information bit pattern may, for example, be one of the currently (Release 7) unused (7-bit) patterns in a channelization code set field of the HS-SCCH. If this specified pattern is received on HS-SCCH, then the UE 101 knows that it should use the default channelization code or codes received at the beginning of the connection via radio resource control (RRC) signaling (the same or different set as for the initial transmission can be configured for the retransmission). Furthermore, the UE 101 knows that this HS-SCCH message refers to a retransmission of a data packet sent on HS-DSCH which was initially transmitted without HS-SCCH. UE 101 also knows, based on this bit pattern, how to interpret the other bits on HS-SCCH. This approach, however, cannot be used if the base station 103 wants to use any arbitrary channelization code set for the retransmission (i.e., different from the default set told at the beginning of the connection).

An alternative approach involves dedicating the value of a given transport parameter only for data packet transmission without HS-SCCH message. For example, a fixed transport block size, or a few sizes, may be assigned for this type of transmission. This fixed transport block size may be transmitted to the UE 101 beforehand through the RRC (Radio Resource Control) signaling (together with other parameters) and again in HS-SCCH messages related to retransmissions of data packets whose initial transmission was sent without the HS-SCCH message. When UE 101 detects a HS-SCCH message and discovers the transport block size dedicated to this type of transmission, it determines that the HS-SCCH message is a retransmission of a data packet whose initial transmission was sent without the HS-SCCH message. Accordingly, the UE 101 is able to decode the contents of the HS-SCCH message properly and obtain knowledge of the TTI used for the previous transmission of the corresponding data packet.

Another approach is to use the UE 101 specific identifier included in the HS-SCCH message. The UE 101 may be provided with two identifiers: one for normal transmission, and one for retransmissions of data packets transmitted initially without the HS-SCCH message. The UE 101 may then detect the identifier contained in a received HS-SCCH message and determine whether the information in the location of the HARQ process number relates to a data packet transmitted previously without a HS-SCCH message (and without the HARQ process number) or to a conventional HARQ process according to Release 6 of 3GPP.

Consequently, the UE 101 may detect the signaling information in the HS-SCCH message; the signaling information can indicate whether the information the transmission time interval of the previous transmission of the data packet, or whether it is a HARQ process number related to another data packet. In one embodiment, the HARQ process number in the HS-SCCH message is a 3-bit word. Two exemplary approaches for transmitting the transmission time indicator are now described. In the example of FIG. 6A, each radio frame includes five sub-frames, and each sub-frame of a radio frame is numbered. Furthermore, each radio frame is also numbered with a radio frame number. The radio frame numbers are often referred to as a "connection frame number" or "system frame number" incremented every 10 ms. According to one embodiment, the transmission time indicator identifies a radio frame number and a radio sub-frame number of the radio sub-frame used for the previous transmission of the data packet. The radio frame number can be denoted as k and radio sub-frame number as n. The transmission time indicator for a transmission attempt may be obtained from the timing of that transmission attempt as (5·k+n) mod 8. For example if the previous (or initial) transmission of the data packet occurred at radio frame 2 and radio sub-frame 4, the transmission time indicator transmitted in the HS-SCCH message of the subsequent retransmission used to identify with which transmission attempt to combine the retransmission with is (5·2+4) mod 8=6 which may be presented in three bits. This transmission time indicator may be considered to be equivalent with a HARQ process number as used in standard Release 6. Here, the window for which the three-bit number refers to is a maximum of eight subframes long and the last sub frame in the window is the sub frame which was transmitted the minimum number of TTIs earlier (the minimum referring to the minimum number of TTIs between (re)transmissions). Release 5 HSDPA (High Speed Downlink Packet Access) specifies this minimum to be 5 TTIs (or subframes), however, future Releases may define this as a parameter. In FIG. 6A, the retransmission 605 whose parameters are sent on HS-SCCH message 607, the window for earlier transmission to be combined with retransmission 605 starts in the first sub frame (n=0) of radio frame k and ends in the third sub frame (n=2) of radio frame k+1.

According to another embodiment, the transmission time indicator may define the number of sub-frames, in addition to the minimum number of sub-frames, between the previous (or initial) transmission and the retransmission of the data packet. There can be a pre-determined minimum number of TTIs (or subframes) between two transmissions related to the same data packet, and this minimum number of TTIs is known by the UE 101 and the base station. The minimum number of TTIs (e.g., five sub-frames) is denoted by reference numeral 603 in FIG. 6A. The total number of sub-frames between the previous (or initial) transmission and the retransmission of the data packet is 7 and, accordingly, the transmitted transmission time indicator is 2 (2+5=7), where 5 is the minimum number of TTIs (or subframes) between the two transmissions.

In addition to the three bits used for transmitting HARQ process number, other bits contained in the HS-SCCH message may be dedicated for the transmission time indicator to expand the time window which could be indicated. For example, the NDI (New Data Indicator) may be used for increasing the length of the transmission time indicator to four bits. Accordingly, the length of the retransmission window would become 16 sub frames. This would increase the buffering capability required from the UE 101 but increase flexibility in the allocation of the retransmissions at the base station.

Alternatively, or additionally, redundancy versions definable in the HS-SCCH message may be redefined. According to conventional Release 6 operation, 8 redundancy versions may be defined by the HS-SCCH message. Accordingly, a used redundancy version is defined by three bits. The number of redundancy versions may be reduced in the data packet transmission according to an embodiment of the invention. The number of redundancy versions may be defined in two bits (four redundancy versions), and the extra bit could be allocated to the expansion of the time window of the transmission time indicator. Together with the NDI and the HARQ bits, the time window of the transmission time indicator would now become 32 sub frames (five bits).

Another approach, in an exemplary embodiment, is to redefine the redundancy versions as in the case of HSUPA (Enhanced Dedicated Channel, E-DCH) where a retransmission sequence number is used. The retransmission sequence number indicates directly the first, the second etc. transmission and at the same time the redundancy version which is tied to the retransmission number. This can be beneficial if a retransmission is missed (HS-SCCH decoding failure). In that case, the next retransmission would indicate the TTI of the previous retransmission (normal transmission time indicator according to an embodiment of the invention), and the UE 101 may deduce from the retransmission sequence number which redundancy version was used in the previous retransmission. Redundancy versions can be sent in any order and, thus, the redundancy version of the next transmission does not tell anything of the previous transmission. The same benefit as that described above may be achieved simply by defining a definite order for the redundancy versions and then the UE 101 could determine the redundancy version of the previous transmission from the current transmission. In this case, the redundancy version is not necessarily bound to the retransmission sequence number.

The earlier described embodiment (where the fixed transport block size is utilized to indicate a retransmission) has the drawback that the particular transport block size cannot be used for an initial transmission with HS-SCCH. This may be necessary if the channelization code(s) reserved for HS-SCCH less initial transmission are used by some other user. The drawback can be overcome by another embodiment, which is described as follows.

At the beginning of the connection, the transport parameters to be used with HS-SCCH-less initial transmission are pre-configured to the UE 101, i.e., sent to the UE 101 using, e.g., RRC signaling. These parameters include those parameters normally sent on HS-SCCH, including the transport block size. As described earlier, the network 100 may communicate several parameter sets to the UE 101 at the beginning and then the UE 101 blindly tries to decode using all the parameter sets. When the UE 101 receives HS-SCCH intended for it (UE specific masking and CRC match), it reads the transport block size field. If that indicates one of the preconfigured transport block sizes, then the UE 101 uses a new interpretation of the other fields of HS-SCCH. This new interpretation may include, e.g., the following: NDI is redefined such that it is always 0 with initial transmission and 1 with retransmission. Furthermore, the HARQ process identifier for the initial transmission can be considered obsolete since the HARQ combining is done based on the transmission time indicator transmitted on HS-SCCH of the retransmission. Alternatively, the HARQ process identifier of the initial transmission can be derived from sub frame and radio frame numbers as described earlier and the retransmission would then use this same number. Essentially, NDI is used to distinguish between these different interpretations of the HARQ process identifiers, instead of using the NDI to indicate the first/retransmission (also the redundancy version (RV) could be used). According to one embodiment, it is defined that the initial transmission always uses a given RV, e.g., RV=0 (000 in binary) and retransmissions always use other RVs. Advantageously, RVs may be used in a given order, e.g., RV=0 for initial transmission, RV=1 for first retransmission, RV=2 for second retransmission, etc. With these arrangements (either NDI or RV indicating first/retransmission), HS-SCCH can be used even with the initial transmission although it would normally be used with only retransmissions. For other transport block sizes, the normal Release 6 interpretation of the HS-SCCH would be used and HS-SCCH would be sent with every transmission.

As mentioned above, the UE 101 may buffer data received on TTIs in which no data packet was detected. As described above, the buffering is performed for the case where the UE 101 cannot decode a data packet intended to it before the retransmission. Upon reception of the transmission time indicator, the UE 101 knows the exact TTI used for transmitting the (previous) data packet and may combine the buffered previous transmission and the current retransmission and detect and decode the data packet. Moreover, the UE 101 may buffer data received on a given number of TTIs, and the maximum amount of buffered data is defined by the maximum delay between a transmission and a retransmission related to the same data packet (or equivalently the window size defined above plus the minimum interval between transmissions). Accordingly, the UE 101 may discard buffered data associated with a TTI for which the difference from the current transmission time interval exceeds the maximum number of TTIs between two transmissions associated with the same data packet.

FIG. 6B shows an example involving several retransmissions of a packet (e.g., two retransmissions in this case). The control channel 611 (e.g., HS-SCCH) and data channel 613 (e.g., HS-DSCH) are illustrated. The numbers within TTIs refer to sub frame numbers, radio frame numbers (k, k+1, k+2, etc.) are given above the HS-SCCH. The initial transmission in sub frame 0 of radio frame k+1 is transmitted without HS-SCCH using the transport parameters communicated to the UE 101 beforehand (using, e.g., RRC signaling). The first retransmission in this example occurs after 6 TTIs (6 sub frames between first and second transmission) in sub frame 2 of radio frame k+2. This retransmission is pre-ceded by HS-SCCH transmission which tells the transport parameters of the current retransmission as well as the transmission time indicator specifying in which TTI the first transmissions occurred (solid arrow pointing backwards). As previously described, transmission time indicator can be implemented in many forms. The UE 101 can now combine the first transmission and the retransmission according to HARQ procedure and attempt to decode the combined packet. If the decoding is not successful (CRC fails), the UE 101 buffers the HARQ combined packet in the position where the retransmission should have been buffered (if no HS-SCCH were received) and may send a NACK message to the base station 103. Because the base station 103 does not receive an ACK, the base station 103 retransmits the data packet the second time in sub-frame 3 of radio frame k+3, again together with HS-SCCH. HS-SCCH now indicates with the transmission time indicator when the previous retransmission occurred (solid arrow). When receiving the second retransmission, the UE 101 is able to HARQ combine it with the previous retransmission which already was HARQ combined with the initial transmission. The UE 101 thus has a packet which is a HARQ combination of all three transmissions. In this manner, this process can continue with even further retransmissions.

FIG. 6B also shows the transmission time indicator windows. The window shows which earlier sub frames (or TTIs) can be addressed with the transmission time indicator. In this example, use of a 3-bit transmission time indicator is assumed and, therefore, the window size is 8. FIG. 6B also shows the minimum transmission interval between (re)transmissions of a data packet. In this example the minimum interval is five sub frames.

It is beneficial to send the NACK if the HS-SCCH of a retransmission was received correctly but the data detection failed. As such, the base station 103 can know whether the UE 101 received the HS-SCCH correctly or not. If the HS-SCCH of the first retransmission is not detected (HS-SCCH CRC fails), then the UE 101 is not able to combine the first transmission and the first retransmission. In this case, the UE 101 should not transmit a NACK since UE 101 does not know whether there was a transmission for it or not. However, the UE 101 should try to decode the transmission with the predetermined parameters (received through RRC signaling); and, if not successful, then buffer the data assuming that the predetermined parameters were used. Subsequently, the base station 103 can retransmit the packet a second time. If this retransmission occurs fast enough, the transmission time indicator can still refer to the initial transmission as indicated in FIG. 6B with a dashed arrow pointing from the HS-SCCH of the second retransmission to the initial data transmission. This can be accomplished if the initial transmission is still within the transmission time indicator window of the second retransmission. Alternatively, the transmission time indicator of the second retransmission can refer to the first retransmission that has been buffered, provided that the first retransmission also used the predetermined parameters.

Typically the transmission time indicator in the HS-SCCH of a re-transmission refers to the previous (re)transmission, but as explained above, in some special cases it may also refer to an earlier transmission of the same data packet.

For the buffering and combining in the UE 101, there are several different alternatives. One approach is to combine the retransmission immediately with the previous transmission(s), and only decode the combined packet. Alternatively, the UE 101 may first try to decode the latest retransmission separately, then combine it with the previous transmission and decode it again, etc. This alternative requires that each transmission is buffered separately, and thus, requires more buffer but in some cases may perform better (combining a relatively error free packet that could have been decoded alone with a very noisy earlier version may result in a packet which is not decodable).

It should be noted that with the proposed arrangement of sending HS-SCCH only with the retransmissions, it is possible to implement a pure ARQ system without HARQ combining of the transmissions. If each (re)transmission is sent using the preconfigured parameters without HS-SCCH, then the UE 101 would not combine any transmissions, which is a pure ARQ system.

The above approaches, according to certain exemplary embodiments, has been described using HSDPA (whereby the control channel is HS-SCCH and data channel HS-DSCH). However, such approaches, according to certain exemplary embodiments, can also be applied for HSUPA, i.e., for uplink transmission. Consequently, the corresponding channels were E-DPCCH as the control channel and E-DCH as the data channel.

Further, the approaches, according to certain exemplary embodiments, can also be applied to other wireless systems using a control channel to indicate transport parameters and a data channel, e.g., a shared data channel. One such system is the long term evolution (LTE) of the UTRA(N) or E-UTRA(N) (Evolved-UTRA(N)) being specified by 3GPP. For LTE system, one joint or separate control channels are specified. These control channels carry information about transport parameters as HS-SCCH in HSDPA. The data is carried on shared (data) channel(s).

The architecture compliant with the UMTS terrestrial radio access network (UTRAN) or Evolved UTRAN (E-UTRAN) in 3GPP, are more fully described below with respect to FIGS. 7A-7D.

FIGS. 7A-7D are diagrams of communication systems having exemplary long-term evolution (LTE) architectures, in which the user equipment (UE) and the base station of FIG. 1 can operate, according to various exemplary embodiments of the invention. By way of example (shown in FIG. 7A), a base station (e.g., destination node 103) and a user equipment (UE) (e.g., source node 101) can communicate in system 700 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 7A:
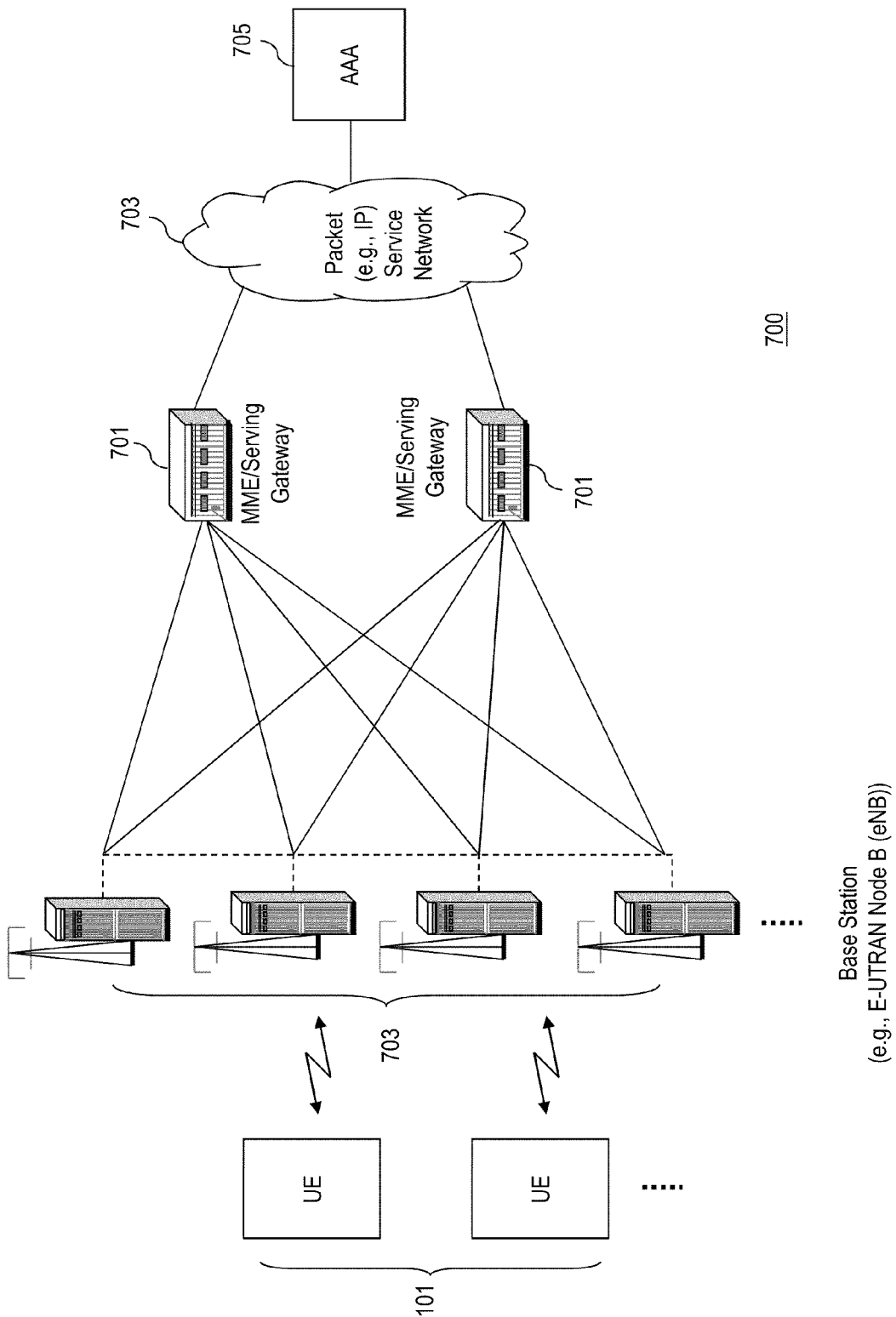
FIGS. 7A-7D are diagrams of communication systems having exemplary long-term evolution (LTE) architectures, in which the system of FIG. 1 can operate, according to various exemplary embodiments of the invention.

The communication system 700 is compliant with 3GPP LTE, entitled "Long Term Evolution of the 3GPP Radio Technology" (which is incorporated herein by reference in its entirety). As shown in FIG. 7A, one or more user equipment (UEs) 101 communicate with a network equipment, such as a base station 103, which is part of an access network (e.g., WiMAX (Worldwide Interoperability for Microwave Access), 3GPP LTE (or E-UTRAN or 8.9G), etc.). Under the 3GPP LTE architecture, base station 103 is denoted as an enhanced Node B (eNB) 103.

MME (Mobile Management Entity)/Serving Gateways 701 are connected to the eNBs 103 in a full or partial mesh configuration using tunneling over a packet transport network (e.g., Internet Protocol (IP) network) 703. Exemplary functions of the MME/Serving GW 701 include distribution of paging messages to the eNBs 103, termination of U-plane packets for paging reasons, and switching of U-plane for support of UE mobility. Since the GWs 701 serve as a gateway to external networks, e.g., the Internet or private networks 703, the GWs 701 include an Access, Authorization and Accounting system (AAA) 705 to securely determine the identity and privileges of a user and to track each user's activities. Namely, the MME Serving Gateway 701 is the key control-node for the LTE access-network and is responsible for idle mode UE tracking and paging procedure including retransmissions. Also, the MME 701 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 7B:
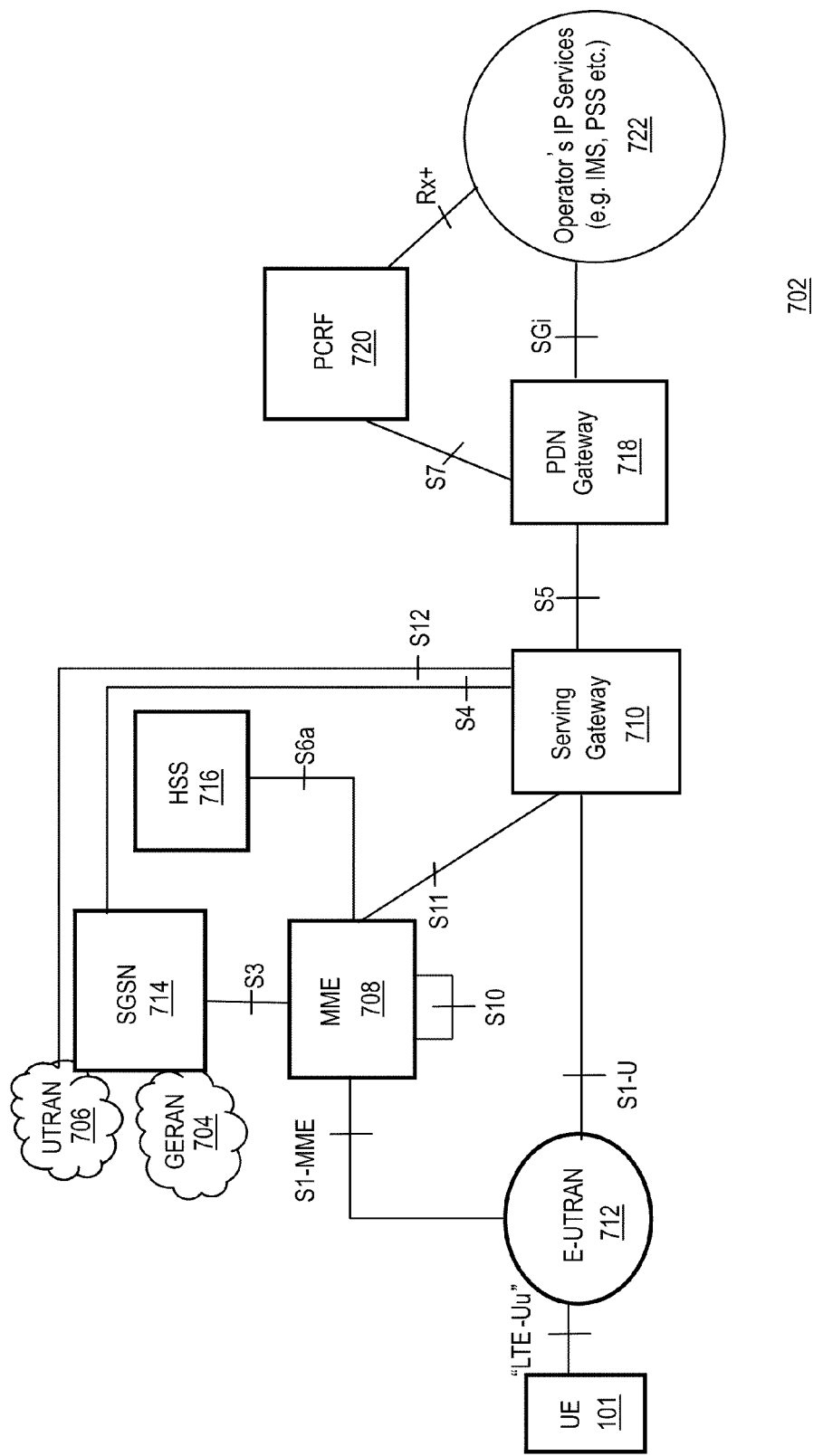

In FIG. 7B, a communication system 702 supports GERAN (GSM/EDGE radio access) 704, and UTRAN 706 based access networks, E-UTRAN 712 and non-3GPP (not shown) based access networks, and is more fully described in TR 23.882, which is incorporated herein by reference in its entirety. A key feature of this system is the separation of the network entity that performs control-plane functionality (MME 708) from the network entity that performs bearer-plane functionality (Serving Gateway 710) with a well defined open interface between them S11. Since E-UTRAN 712 provides higher bandwidths to enable new services as well as to improve existing ones, separation of MME 708 from Serving Gateway 710 implies that Serving Gateway 710 can be based on a platform optimized for signaling transactions. This scheme enables selection of more cost-effective platforms for, as well as independent scaling of, each of these two elements. Service providers can also select optimized topological locations of Serving Gateways 710 within the network independent of the locations of MMEs 708 in order to reduce optimized bandwidth latencies and avoid concentrated points of failure.

As seen in FIG. 7B, the E-UTRAN (e.g., eNB) 712 interfaces with UE 101 via LTE-Uu. The E-UTRAN 712 supports LTE air interface and includes functions for radio resource control (RRC) functionality corresponding to the control plane MME 708. The E-UTRAN 712 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 708, as a key control node, is responsible for managing mobility UE identifies and security parameters and paging procedure including retransmissions. The MME 708 is involved in the bearer activation/deactivation process and is also responsible for choosing Serving Gateway 710 for the UE 101. MME 708 functions include Non Access Stratum (NAS) signaling and related security. MME 708 checks the authorization of the UE 101 to camp on the service provider's Public Land Mobile Network (PLMN) and enforces UE 101 roaming restrictions. The MME 708 also provides the control plane function for mobility between LTE and 2G/3G access networks with the S3 interface terminating at the MME 708 from the SGSN (Serving GPRS Support Node) 714.

The SGSN 714 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 708 and HSS (Home Subscriber Server) 716. The S10 interface between MMEs 708 provides MME relocation and MME 708 to MME 708 information transfer. The Serving Gateway 710 is the node that terminates the interface towards the E-UTRAN 712 via S1-U.

The S1-U interface provides a per bearer user plane tunneling between the E-UTRAN 712 and Serving Gateway 710. It contains support for path switching during handover between eNBs 103. The S4 interface provides the user plane with related control and mobility support between SGSN 714 and the 3GPP Anchor function of Serving Gateway 710.

The S12 is an interface between UTRAN 406 and Serving Gateway 710. Packet Data Network (PDN) Gateway 718 provides connectivity to the UE 101 to external packet data networks by being the point of exit and entry of traffic for the UE 101. The PDN Gateway 718 performs policy enforcement, packet filtering for each user, charging support, lawful interception and packet screening. Another role of the PDN Gateway 718 is to act as the anchor for mobility between 3GPP and non-3GPP technologies such as WiMax and 8GPP2 (CDMA 1X and EvDO (Evolution Data Only)).

The S7 interface provides transfer of QoS policy and charging rules from PCRF (Policy and Charging Role Function) 720 to Policy and Charging Enforcement Function (PCEF) in the PDN Gateway 718. The SGi interface is the interface between the PDN Gateway and the operator's IP services including packet data network 722. Packet data network 722 may be an operator external public or private packet data network or an intra operator packet data network, e.g., for provision of IMS (IP Multimedia Subsystem) services. Rx+ is the interface between the PCRF and the packet data network 722.

Figure 7C:
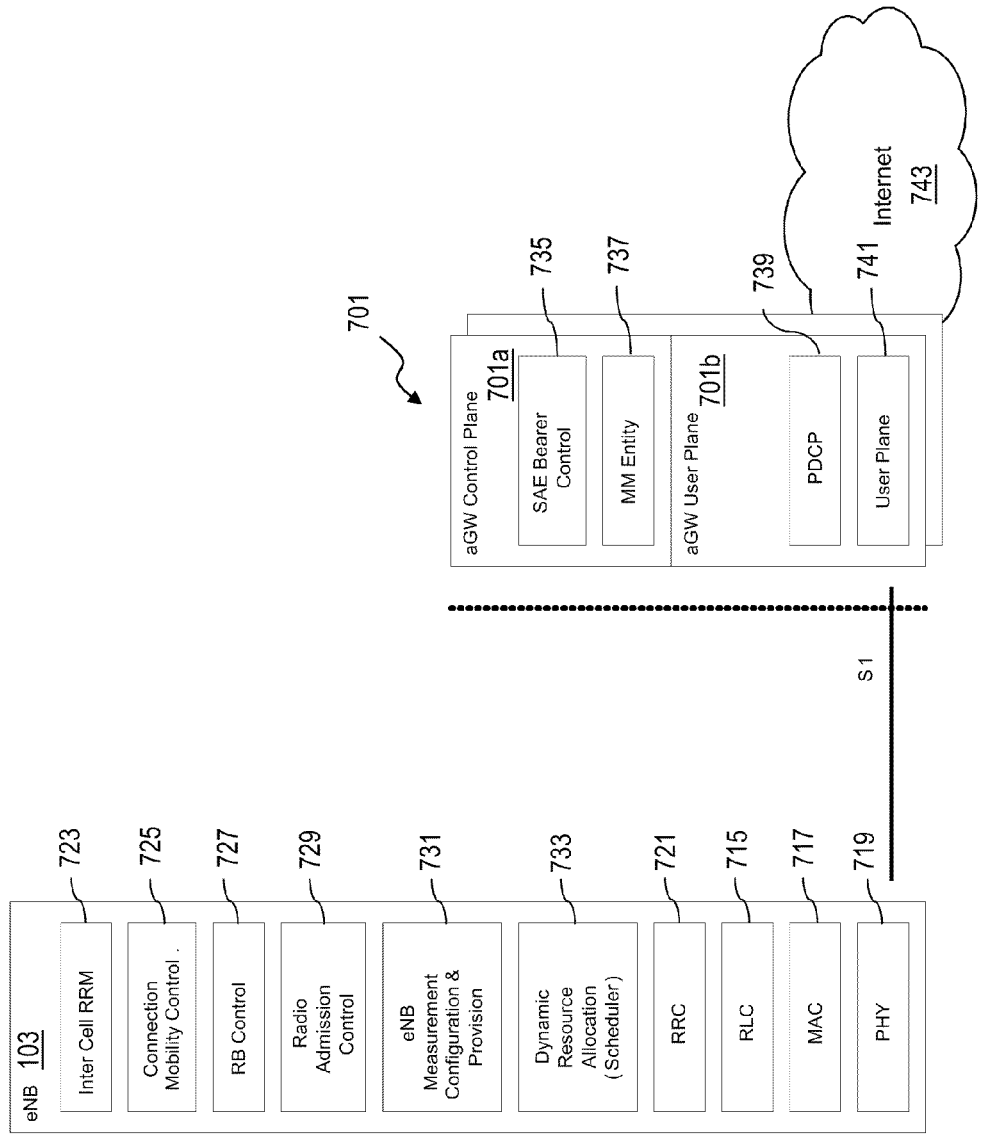

As seen in FIG. 7C, the eNB 103 utilizes an E-UTRA (Evolved Universal Terrestrial Radio Access) (user plane, e.g., RLC (Radio Link Control) 715, MAC (Media Access Control) 717, and PHY (Physical) 719, as well as a control plane (e.g., RRC 721)). The eNB 103 also includes the following functions: Inter Cell RRM (Radio Resource Management) 723, Connection Mobility Control 725, RB (Radio Bearer) Control 727, Radio Admission Control 729, eNB Measurement Configuration and Provision 731, and Dynamic Resource Allocation (Scheduler) 733.

The eNB 103 communicates with the aGW 701 (Access Gateway) via an S1 interface. The aGW 701 includes a User Plane 701a and a Control plane 701b. The control plane 701b provides the following components: SAE (System Architecture Evolution) Bearer Control 735 and MM (Mobile Management) Entity 737. The user plane 701b includes a PDCP (Packet Data Convergence Protocol) 439 and a user plane functions 741. It is noted that the functionality of the aGW 701 can also be provided by a combination of a serving gateway (SGW) and a packet data network (PDN) GW. The aGW 701 can also interface with a packet network, such as the Internet 743.

Figure 7D:
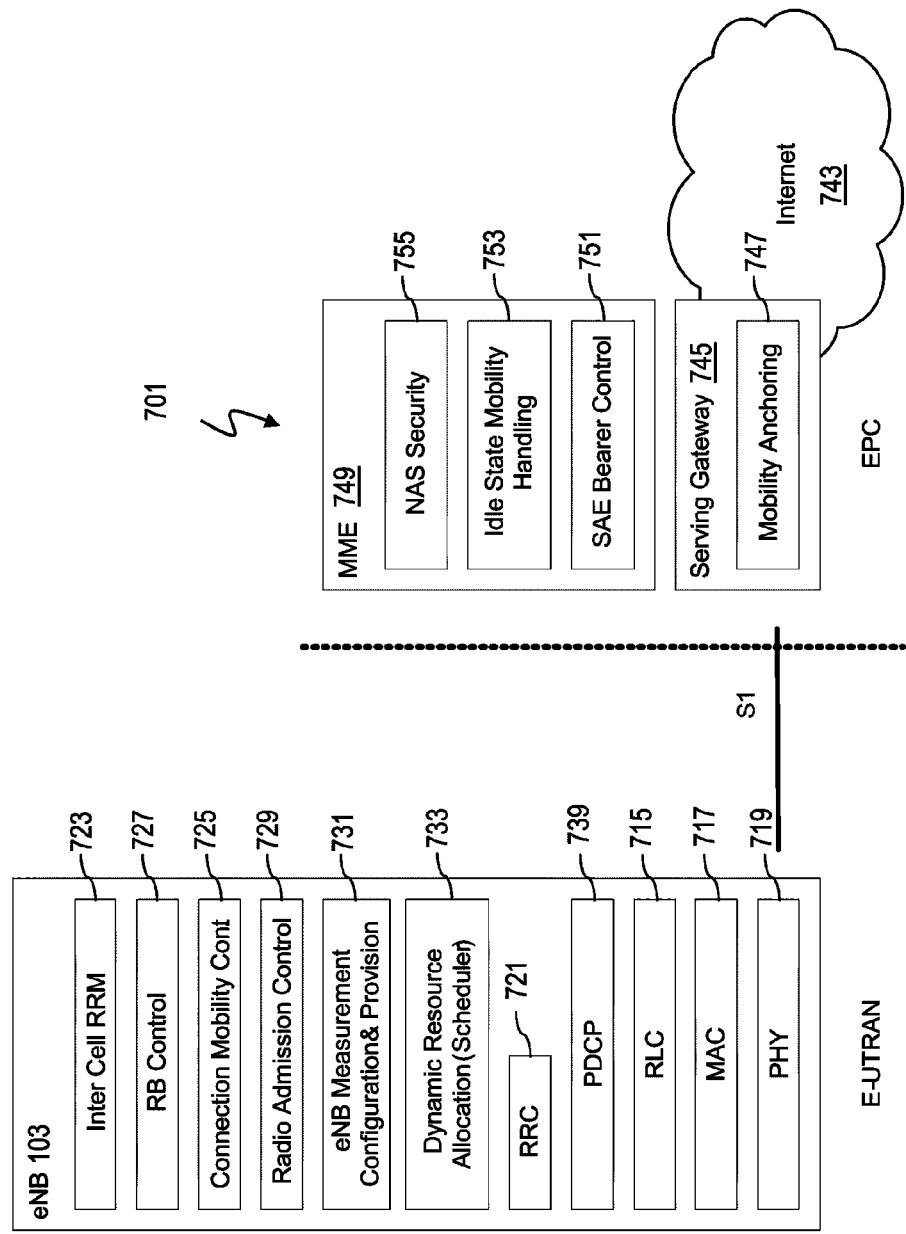

In an alternative embodiment, as shown in FIG. 7D, the PDCP (Packet Data Convergence Protocol) functionality can reside in the eNB 103 rather than the GW 701. Other than this PDCP capability, the eNB functions of FIG. 7C are also provided in this architecture.

In the system of FIG. 7D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 745, which includes a Mobility Anchoring function 747. According to this architecture, the MME (Mobility Management Entity) 749 provides SAE (System Architecture Evolution) Bearer Control 751, Idle State Mobility Handling 753, and NAS (Non-Access Stratum) Security 755.

One of ordinary skill in the art would recognize that the processes for providing retransmissions may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 8.

Figure 8:
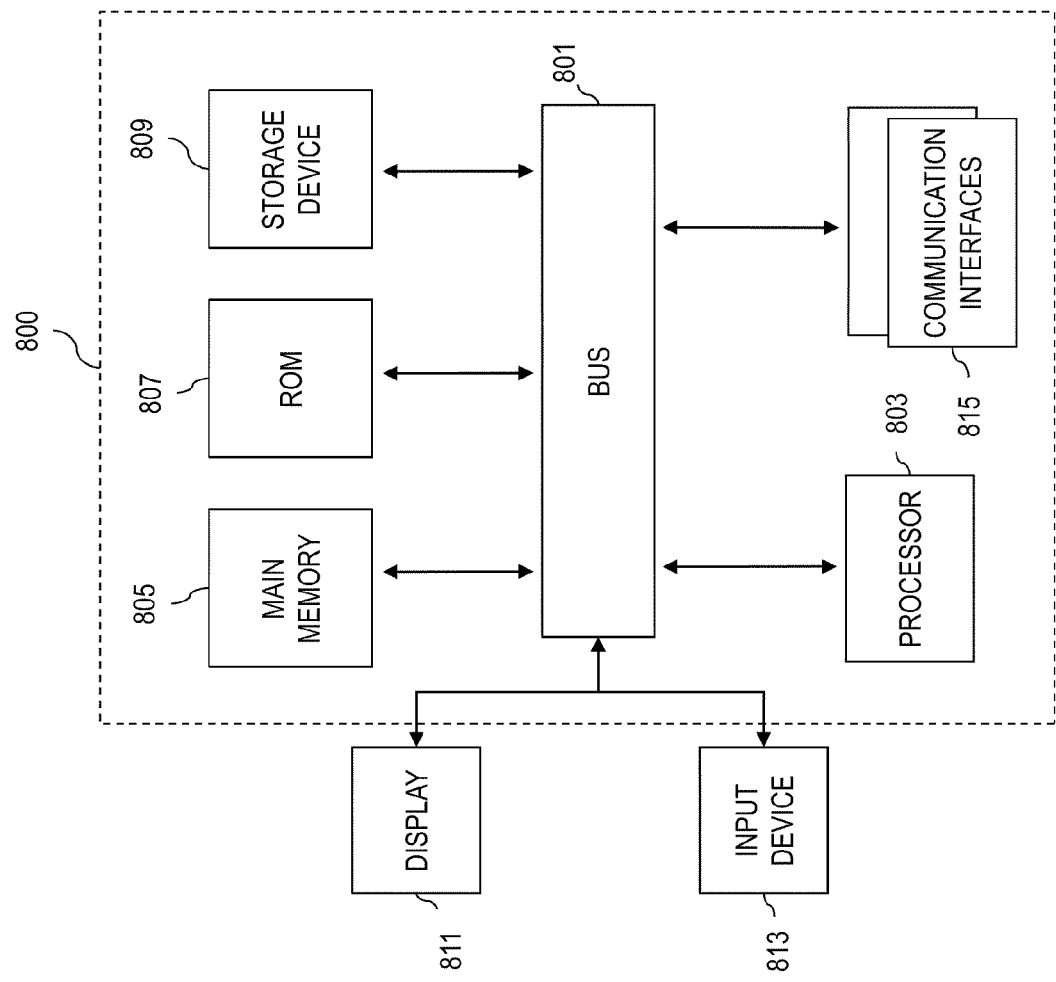
FIG. 8 is a diagram of hardware that can be used to implement an embodiment of the invention.

FIG. 8 illustrates exemplary hardware upon which various embodiments of the invention can be implemented. A computing system 800 includes a bus 801 or other communication mechanism for communicating information and a processor 803 coupled to the bus 801 for processing information. The computing system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computing system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computing system 800 may be coupled with the bus 801 to a display 811, such as a liquid crystal display, or active matrix display, for displaying information to a user. An input device 813, such as a keyboard including alphanumeric and other keys, may be coupled to the bus 801 for communicating information and command selections to the processor 803. The input device 813 can include a cursor control, such as a mouse, a trackball, or cursor direction keys, for communicating direction information and command selections to the processor 803 and for controlling cursor movement on the display 811.

According to various embodiments of the invention, the processes described herein can be provided by the computing system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 800 also includes at least one communication interface 815 coupled to bus 801. The communication interface 815 provides a two-way data communication coupling to a network link (not shown). The communication interface 815 sends and receives electrical, electromagnetic, or optical signals that carry digital data streams representing various types of information. Further, the communication interface 815 can include peripheral interface devices, such as a Universal Serial Bus (USB) interface, a PCMCIA (Personal Computer Memory Card International Association) interface, etc.

The processor 803 may execute the transmitted code while being received and/or store the code in the storage device 809, or other non-volatile storage for later execution. In this manner, the computing system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
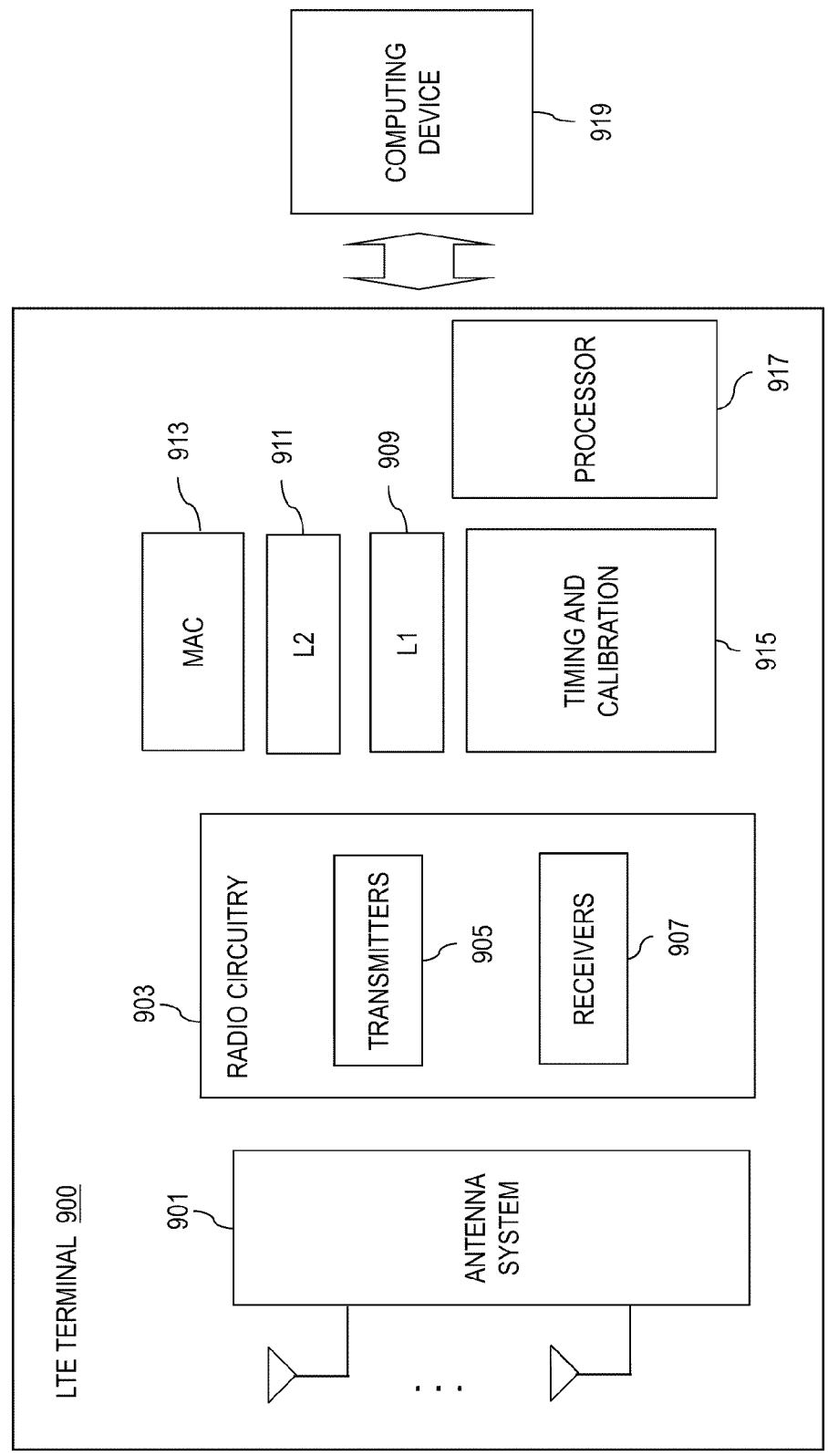
FIG. 9 is a diagram of exemplary components of an LTE terminal configured to operate in the systems of FIGS. 7A-7D, according to an embodiment of the invention.

FIG. 9 is a diagram of exemplary components of an LTE terminal capable of operating in the systems of FIGS. 7A-7D, according to an embodiment of the invention. An LTE terminal 900 is configured to operate in a Multiple Input Multiple Output (MIMO) system. Consequently, an antenna system 901 provides for multiple antennas to receive and transmit signals. The antenna system 901 is coupled to radio circuitry 903, which includes multiple transmitters 905 and receivers 907. The radio circuitry encompasses all of the Radio Frequency (RF) circuitry as well as base-band processing circuitry. As shown, layer-1 (L1) and layer-2 (L2) processing are provided by units 909 and 911, respectively. Optionally, layer-3 functions can be provided (not shown). Module 913 executes all MAC layer functions. A timing and calibration module 915 maintains proper timing by interfacing, for example, an external timing reference (not shown). Additionally, a processor 917 is included. Under this scenario, the LTE terminal 900 communicates with a computing device 919, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to allocate a first transmission resource for transmitting data according to a transmission scheme; and
   determining to allocate a second transmission resource for retransmitting the data according to the transmission scheme,
   wherein the transmission scheme specifies a relationship between the transmitted data and the retransmitted data for error detection of the transmitted data, and
   wherein the transmission scheme provides the transmission of the data using an allocation fixed in frequency and the retransmission of the data using allocation in time to specify the relationship.

2. A method according to claim 1, wherein the error detection is performed according to a hybrid automatic repeat request (HARQ) protocol.

3. A method according to claim 1, wherein the transmission scheme provides the transmission of the data using an allocation fixed in time and the retransmission of the data using allocation in frequency to specify the relationship.

4. A method according to claim 1, wherein the transmitted data is combined with the retransmitted data based on the specified relationship.

5. A method according to claim 1, wherein channel quality information is transmitted to a base station of a Third Generation Partnership Project (3GPP) system.

6. A method according to claim 1, wherein one or more physical resource blocks of the allocation for the first transmission resource are fixed in frequency and dynamic in time, the transmission is indicated by a timing of the retransmission, and the retransmission is synchronous and adaptive.

7. A method according to claim 1, wherein one or more physical resource blocks of the allocation for the first transmission resource are fixed in time and dynamic in frequency, the transmission is indicated by a frequency of the retransmission, and the retransmission is asynchronous and non-adaptive.

8. An apparatus comprising:

at least one processor; and at least one memory including computer program code for one or more programs, the at least one memory and the computer program code configured to, with the at least one processor, cause the apparatus to perform at least the following, determine to allocate a first transmission resource for transmitting data according to a transmission scheme; and determine to allocate a second transmission resource for retransmitting the data according to the transmission scheme, wherein the transmission scheme specifies a relationship between the transmitted data and the retransmitted data for error detection of the transmitted data, and wherein the transmission scheme provides the transmission of the data using an allocation fixed in frequency and the retransmission of the data using allocation in time to specify the relationship.

9. An apparatus according to claim 8, wherein the error detection is performed according to a hybrid automatic repeat request (HARQ) protocol.

10. An apparatus according to claim 8, wherein the transmission scheme provides the transmission of the data using an allocation fixed in time and the retransmission of the data using allocation in frequency to specify the relationship.

11. An apparatus according to claim 8, wherein the transmitted data is combined with the retransmitted data based on the specified relationship.

12. An apparatus according to claim 8, wherein channel quality information is transmitted to a base station of a Third Generation Partnership Project (3GPP) system.

13. An apparatus according to claim 8, wherein the apparatus is a handset.

14. An apparatus according to claim 8, wherein one or more physical resource blocks of the allocation for the first transmission resource are fixed in frequency and dynamic in time, the transmission of the data is indicated by a timing of the retransmission, and the retransmission is synchronous and adaptive.

15. An apparatus according to claim 8, wherein one or more physical resource blocks of the allocation for the first transmission resource are fixed in time and dynamic in frequency, the transmission of the data is indicated by a frequency of the retransmission, and the retransmission is asynchronous and non-adaptive.

16. A system comprising:

a base station configured to allocate a first transmission resource for transmitting data according to a transmission scheme and to allocate a second transmission resource for retransmitting the data according to the transmission scheme, wherein the transmission scheme specifies a relationship between the transmitted data and the retransmitted data for error detection of the transmitted data, and wherein the transmission scheme provides the transmission of the data using an allocation fixed in frequency and the retransmission of the data using allocation in time to specify the relationship.

17. An apparatus comprising:

means for allocating a first transmission resource for transmitting data according to a transmission scheme; and means for allocating a second transmission resource for retransmitting the data according to the transmission scheme, wherein the transmission scheme specifies a relationship between the transmitted data and the retransmitted data for error detection of the transmitted data, and wherein the transmission scheme provides the transmission of the data using an allocation fixed in frequency and the retransmission of the data using allocation in time to specify the relationship.

18. A method comprising:

determining to allocate a first transmission resource for transmitting data according to a transmission scheme; and determining to allocate a second transmission resource for retransmitting the data according to the transmission scheme, wherein the transmission scheme specifies a relationship between the transmitted data and the retransmitted data for error detection of the transmitted data, and wherein the transmission scheme provides the transmission of the data using an allocation fixed in time and the retransmission of the data using allocation in frequency to specify the relationship.

19. A method comprising:

determining to allocate a first transmission resource for transmitting data according to a transmission scheme; and determining to allocate a second transmission resource for retransmitting the data according to the transmission scheme, wherein the transmission scheme specifies a relationship between the transmitted data and the retransmitted data for error detection of the transmitted data, and wherein one or more physical resource blocks of the allocation for the first transmission resource are fixed in frequency and dynamic in time, the transmission is indicated by a timing of the retransmission, and the retransmission is synchronous and adaptive.

20. A method comprising:

determining to allocate a first transmission resource for transmitting data according to a transmission scheme; and determining to allocate a second transmission resource for retransmitting the data according to the transmission scheme, wherein the transmission scheme specifies a relationship between the transmitted data and the retransmitted data for error detection of the transmitted data, and wherein one or more physical resource blocks of the allocation for the first transmission resource are fixed in time and dynamic in frequency, the transmission is indicated by a frequency of the retransmission, and the retransmission is asynchronous and non-adaptive.

21. An apparatus comprising:

at least one processor; and at least one memory including computer program code for one or more programs, the at least one memory and the computer program code configured to, with the at least one processor, cause the apparatus to perform at least the following, determine to allocate a first transmission resource for transmitting data according to a transmission scheme; and determine to allocate a second transmission resource for retransmitting the data according to the transmission scheme, wherein the transmission scheme specifies a relationship between the transmitted data and the retransmitted data for error detection of the transmitted data, and wherein the transmission scheme provides the transmission of the data using an allocation fixed in time and the retransmission of the data using allocation in frequency to specify the relationship.

22. An apparatus comprising:

at least one processor; and at least one memory including computer program code for one or more programs, the at least one memory and the computer program code configured to, with the at least one processor, cause the apparatus to perform at least the following, determine to allocate a first transmission resource for transmitting data according to a transmission scheme; and determine to allocate a second transmission resource for retransmitting the data according to the transmission scheme, wherein the transmission scheme specifies a relationship between the transmitted data and the retransmitted data for error detection of the transmitted data, and wherein one or more physical resource blocks of the allocation for the first transmission resource are fixed in frequency and dynamic in time, the transmission of the data is indicated by a timing of the retransmission, and the retransmission is synchronous and adaptive.

23. An apparatus comprising:

at least one processor; and at least one memory including computer program code for one or more programs, the at least one memory and the computer program code configured to, with the at least one processor, cause the apparatus to perform at least the following, determine to allocate a first transmission resource for transmitting data according to a transmission scheme; and determine to allocate a second transmission resource for retransmitting the data according to the transmission scheme, wherein the transmission scheme specifies a relationship between the transmitted data and the retransmitted data for error detection of the transmitted data, and wherein one or more physical resource blocks of the allocation for the first transmission resource are fixed in time and dynamic in frequency, the transmission of the data is indicated by a frequency of the retransmission, and the retransmission is asynchronous and non-adaptive.

24. A system comprising:

a base station configured to allocate a first transmission resource for transmitting data according to a transmission scheme and to allocate a second transmission resource for retransmitting the data according to the transmission scheme, wherein the transmission scheme specifies a relationship between the transmitted data and the retransmitted data for error detection of the transmitted data, and wherein the transmission scheme provides the transmission of the data using an allocation fixed in time and the retransmission of the data using allocation in frequency to specify the relationship.

25. An apparatus comprising:

means for allocating a first transmission resource for transmitting data according to a transmission scheme; and means for allocating a second transmission resource for retransmitting the data according to the transmission scheme, wherein the transmission scheme specifies a relationship between the transmitted data and the retransmitted data for error detection of the transmitted data, and wherein the transmission scheme provides the transmission of the data using an allocation fixed in time and the retransmission of the data using allocation in frequency to specify the relationship.

* * * * *